United States Patent [19]

Precourt

[11] 4,000,513
[45] Dec. 28, 1976

[54] APPARATUS AND METHOD FOR DATA RECORDING WITH PEAK SHIFT COMPENSATION

[75] Inventor: Normand E. Precourt, Norristown, Pa.

[73] Assignee: Computer Peripherals, Inc., Edina, Minn.

[22] Filed: July 28, 1975

[21] Appl. No.: 599,917

[52] U.S. Cl. .............................................. 360/45
[51] Int. Cl.$^2$ .......................................... G11B 5/09
[58] Field of Search .............................. 360/45, 39

[56] References Cited

UNITED STATES PATENTS

| | | | |
|---|---|---|---|
| 3,067,422 | 12/1962 | Hunt | 360/45 |
| 3,488,662 | 1/1970 | Vallee | 360/45 |
| 3,879,342 | 4/1975 | Patel | 360/45 |
| 3,911,485 | 10/1975 | McGrath | 360/45 |
| 3,930,265 | 12/1975 | Kimura | 360/45 |

*Primary Examiner* — Vincent P. Canney
*Attorney, Agent, or Firm* — J. T. Cavender; Wilbert Hawk, Jr.; Jeffrey P. Morris

[57] ABSTRACT

A data writing and recording system and method and circuitry therefor is disclosed in which peak shift due to pulse crowding of data recorded on a magnetic medium is substantially reduced. The recorded data time pattern is preemphasized to compensate for peak shift such that an optimum magnetic pattern is recorded on the magnetic medium. The preemphasis of recorded peak shift errors is accomplished either by delaying or advancing the time when a particular peak shifted data transition caused by a known encoding data pattern will occur. NRZI type encoded data is coupled to a first serial to parallel shift register and clocked through to a ROM at a frequency corresponding to the data bit cell width. The ROM examines the incoming data, which is also clocked from an intermediate stage in the first shift register to a second serial-to-parallel shift register having a data clock frequency substantially greater than the data clock frequency of the first shift register. The second shift register operates as a multi-tapped delay line having a multiplexed output selected by a look-up table programmed into the ROM in accordance with a determination by the ROM of the degree incoming peak shift and the amount of compensation required. Thus, data is either delayed or advanced before it is written, thereby compensating for peak shift error which would otherwise be present in the recorded data.

25 Claims, 9 Drawing Figures

APPARATUS AND METHOD FOR DATA RECORDING WITH PEAK SHIFT COMPENSATION

BACKGROUND OF THE INVENTION

1. Field of the Invention

The present invention relates to a data recording and decoding system and more particularly to an improved method of digital recording for substantially reducing peak shift data errors caused by particular encoded data patterns. The present invention is particularly useful in connection with the writing of digital data on a magnetic medium, and with the accurate reproduction and decoding of such recorded data by magnetic tape subsystems.

2. Description of the Prior Art

Modern data processing systems include a variety of means for recording or writing digital data on a like variety of recording or writing media. The present invention is described in the context generally of a magnetic media such as magnetic tape; however, the present invention is applicable to any form of recording of digital data having predictable characteristics on any recordng media. The words "recording" and "writing" are interchangeably used herein to designate the recording of electrical data signals on a data storage medium.

It is desirable in such systems to maximize the reliability of data writing and reproduction, while at the same time maximizing the data throughput, all with a minimum of errors. This is achieved in present day magnetic tape systems by increasing both the storage and reproduction (writing and reading) speeds and by increasing the data density (bits per unit length) on the magnetic tape. As the data recording density is increased, various undesirable effects occur as a reslt of the interaction of the magnetic domains which comprise the data bits on the magnetic medium, which interaction limits the density at which data can be recorded. Various encoding techniques have been developed for reducing these effects, including run length limited coding, group code recording (GCR), etc.; however, in any encoding scheme, the above-mentioned undesirable effects occur at some given data density. One such undesirable effect is called peak shift or bit shift, and occurs as a result of pulse crowding of the data bits on the recording medium, and results in a shifting of the data transition locations from their proper location.

Individual data bits are recorded during their respective bit cell times such that a change of magnetic flux at the discrete locations within the data bit cell boundaries is indicative of the recorded data, which is written as a logical one or a logical zero. A flux transition may be either a reversal of polarity or a change from one level of magnetization to another. As used herein, a "flux reversal" is defined as that point which exhibits the maximum free space surface flux density normal to the surface of the magnetic media, and is used interchangeably with "transition". In NRZ-1 encoding, for example, such a transition whenever a logical one is to be recorded. Also as used herein, a data bit cell is defined as that time period during which one data representative flux transition should properly occur.

As data is recorded at high density, and in particular, when no data transition is present for two or more sequentially occuring bit cells, the point in time on the magnetic medium at which the next following transition occurs is shifted from its proper place, causing the bit cell width to vary, with the result that decoding circuits, particularly phase-locked loop decoders, may decode erroneous data due to loss of synchronization with incoming data or due to the decoding of a transition occuring in an adjacent bit cell.

Various approaches exist in the prior art for providing peak shift compensation in magentic recording; however, such prior art approaches require complex and expensive circuitry to accomplish their intended function.

One such prior art technique is described by U.S. Pat. No. 3,503,059, entitled "Pulse Crowding Compensation for Magnetic Recording" issued to Louis E. Ambrico. This patent describes "step write compensation" by which techniques the written pulses are stepped to improve the pulse symmetry by providing, after each major transition, a minor transition of the recording current in the opposite direction.

Another prior art technique is described by U.S. Pat. No. 3,879,342, entitled "Pre-Recorded Digital Data Compensation System" issued to Ramesh S. Patel. This patent describes a means of compensation for pulse shift introduced in three frequency encoding. A pulse shift circuit advances or delays the writing pulses; however, three separate clock signals are required. In contradistinction, the present invention utilizes a single shift register operating as a multitapped delay having a multiplexed output to provide any required transition delay or advancement.

SUMMARY OF THE INVENTION

The present invention relates to the compensation of writing errors on magnetic recording media by pre-emphasis of the transition locations of the recording signal prior to writing of the recording signal on the magnetic media. More particularly, digitally encoded data having varying degress of peak shift resultant from the encoding patterns present, i.e., two or more logical zeros in succession is clocked through a first serial to parallel conversion circuit, preferably a shift register, at a first data clocking frequency having a period approximately equal to the data bit cell width of the clocked data. The parallel data output from each stage of the first shift register is coupled to a read only memory wherein the particular data pattern coupled thereto is recognized and utilized to actuate a lookup table for generating a binary error correction or selection signal. Since the errors associated with each encoded data pattern are known, the amount of compensation required to shift the occurrence of the data transition points is also known. Compensation is achived by advancing or delaying the data transitions in accordance with the selection signal generated from the read only memory, which is programmed to function as a lookup table of peak shift compensation values. The data from the first shift register is serially coupled to a second shift register, clocked at a second frequency, at at a rate such that data is clocked through the second shift register in a time period corresponding to the time period required to clock the same data through one stage of the first shift register, i.e., one bit cell period. The selection signal from the ROM selects an output from the second shift register for serially coupling the data therefrom, with each possible output being coupled from a diffeent stage of the second shift register. Thus, the second shift register functions as a multitap delay line, while the ROM examines incoming data for determination of the requisite delay prior to writing the data. By serially coupling data from an intermediate stage of the first register to the first register to the second register, some of the output taps from the second register provide delay while some provide advancement of the data transition points.

It is therefore an object of the present invention to provide an improved write compensation sysem wherein a shift register provides a multitap delay for selectively providing peak shift compensation prior to recording data on a magnetic media.

It is another object of the invention to control the degree of peak shift compensation provided by means of a lookup table of values for preemphasis of the data transition points.

It is yet another object of the present invention to provide a method of compensation for peak shift errors in magnetic recording by generating a table controlled write compensation signal for preemphasizing the data transitions in accordance with the particular encoding patterns present in the data to be recorded.

Further objects and advantages of the invention will become apparent from the following detailed description taken together with the accompanying drawings.

DESCRIPTION OF THE PREFERRED EMBODIMENT

Figure 1:
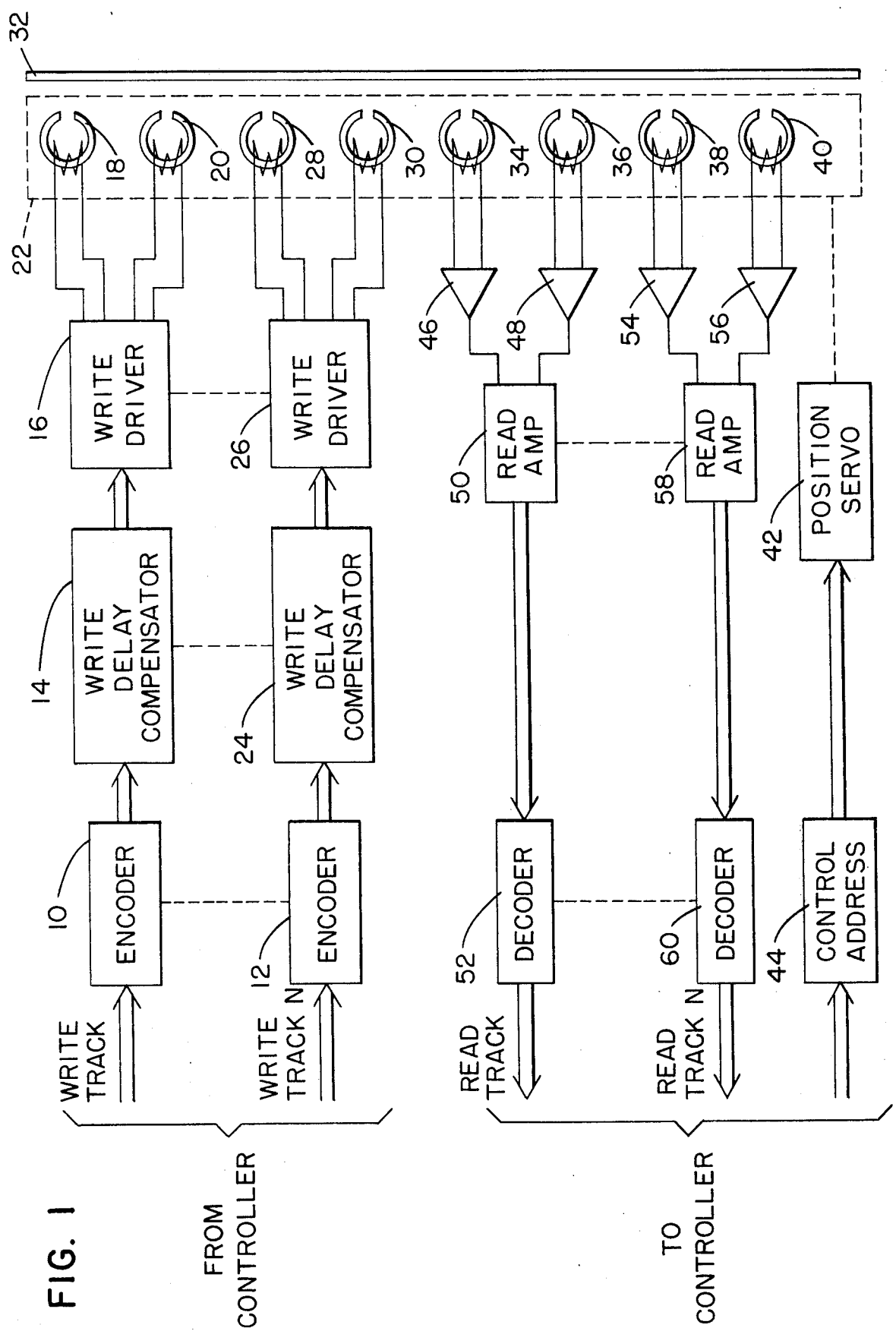
FIg. 1 is a simplified block diagram of a magnetic recording and reading system with which the present invention may be utilized.

Referring now to FIG. 1, a multitrack magnetic tape recording and reading subsystem is illustrated. Data is coupled from a data source such as a central computer, a controller or any data storage means, either on-line or off-line on a plurality of data tracks one through N in a known manner. Encoders 10 and 12, which are preferably included within the controller, encode data on tracks one and N, respectively, in any desired code, such as NRZI or GCR (such as the IBM Proposed American National Standard). As previously discussed, the encoded data is peak shifted in accordance with the encoding pattern and due to time asymetry in the recordng process. Write delay compensation circuit 14 receives input data on write track one coupled thereto from encoder 10. Since the degree of peak shift error is due wholly to the recording process, such error is substantially predictable and repeatable. Thus the delay or advancement of a particular data transition within its data bit cell by some known amount is compensated for by preemphasizing the transition by an opposing amount to counterbalance the errors inherent in the recording process. Thus, if a particular data transition is delayed ten percent in the recording process, due to the data pattern, the delay compensation circuit 14 advances the transition ten percent, as will be described in detail with respect to FIGS. 2 through 4. compensated encoded data in channel one is coupled to a write driver amplifier 16 of conventional design for driving magnetic recording heads such as heads 18 and 20, which may or may not have multiplexed write current inputs. Of course, write driver 16 could drive a single recording head or a plurality of recording heads such as illustrated. All of the individual magnetic writing and reading heads comprise a single multitrack head 22 in accordance with well known magnetic recording techniques. A conventional multitrack recording head 22 may be utilized by the present invention; such as, for example, a nine track magnetic head.

Encoded data in track N is coupled from encoder 12 to a write delay compensation circuit 24 of identical design as write delay compensation circuit 14 and, after approximate data delay or advancement in time, the compensated data is coupled to a write drive amplifier 26 for driving recording heads 28 and 30 associated therewith. The compensated data is written in its respective data tracks by magnetic recording heads 18, 20, 28 and 30 on a recording medium 32, preferably magnetic tape.

Data recorded on the magnetic tape 32 is retrieved by reading heads 34 and 36 associated with reading track one and recording heads 39 and 40 associated with reading track N. The reading heads 34 through 40 are positioned in proximity to the moving data bearing magnetic medium 32 by a recording heading position control servomechanism 42 which positions the recording head 22 as a unit across the recording medium 32. The positioning servo 42 is controlled by stored position control addresses in the controller or accessible thereby such as by means of a memory 44. the positioning of the magnetic head with respect to the reading medium may be accomplished by any of a number of well known techniques of the magnetic recording art, and does not in and of itself constitute a portion of the present invention.

Reading transducers 34 and 36 are coupled to preamplifiers 46 and 48, respectively, and then to a read amplifier 50 which supplies amplified data signals to a data decoder 52 which decodes the data signal coupled thereto in reading track 1. Decoder 52 may comprise a phase locked loop decoder utilizing peak or zero crossing detection suitable for decoding NRZI, Manchester, GCR or other known data formats. A suitable decoder is described by U.S. Pat. No. Reissue 28,330, assigned to the same assignee as is the present invention. Data recorded on channel N is read in the identical manner as is data recorded in channel I, with preamplifiers 54 and 56 having coupled thereto data read by reading heads 38 and 40, respectively. Preamplified data is then amplified by a read amplifier 58 having an output coupled to a data decoder 60. The decoded data for tracks one through N is coupled via data channels to the central controller or other data utilization means.

Figure 2:
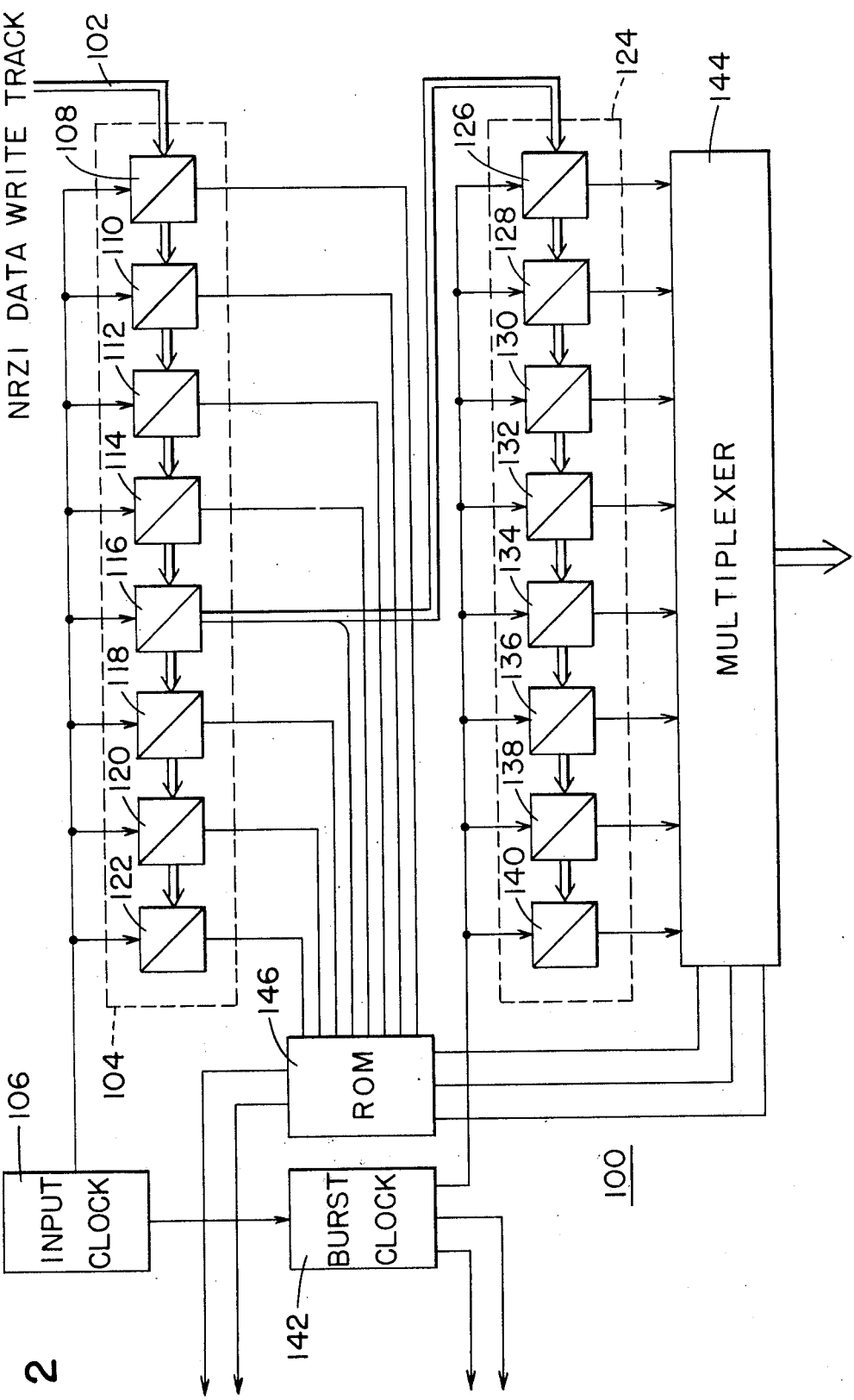
FIG. 2 is a simplified block diagram of an embodiment of the present invention.

Referring now to FIG. 2, a simplified block diagram of a write compensation circuit in accordance with the present invention is illustrated generally at 100. Encoded NRZI data from encoder 10 is coupled via data input channel 102 to a first shift register 104 capable of parallel transfer of an 8-bolt code. The incoming NRZI data is illustrated by waveform 3(C), which represents the binary code 11011111. In NRZI encoding, a flux transition on the magnetic medium represents a binary 1 and no flux transition a binary 0. The medium is divided into bit cells, each of predefined length and each capable of having recorded therein one bit of binary data. Of course, other recording schemes may be employed by the present invention. The data in channel 102 is clocked at a frequency corresponding to the data bit cell period by an input clock 106 of about 1.2 MH$_z$ serially through the stages 108 through 122 of shift register 104.

About half way through shift register 104, at flip-flop 116, the data being shifted by the input or cell clock 106, is serially transferred to a second shift register 124 comprised of stages 126 through 140, through which shift register 124 the data is shifted at a much higher frequency than the same data is shifted through shift register 104. In the illustrated embodiment, a burst or phase clock 142 detects the occurrence of each input clock 106 pulse and generates a train of nine pulses for each input clock pulse. Thus, data bits are shifted through shift register 124 at nine times the rate as they are shifted through shift register 104, and register 124 thus functions as the equivalent of a multitap delay line, with the amount of delay depending only upon which tap is selected for data transfer to a multiplexer 144. Multiplexer 144 controls the selection of data from any of the outputs of shift register 124, stages 126 through 140 by means of a three-bit binary selection signal derived by a read only memory (ROM) 146 which performs the selection code generation function by examination of the data contents of shift register 104 coupled thereto as an 8-bit address code. This data content of stages 108 through 122 is coupled in parallel to ROM 146, wherein a look-up table is programmed to perform the logical decision of whether to advance or retard the data transition before writing by selection of the appropriate stage of register 124 via multiplexer 144 for coupling the data bits to the writing head in accordance with the derived binary selection code. Thus, register 124 performs a "fine tuning function", while ROM 146 examines incoming data by looking both ahead and behind in time at the data contained in register 104, an "eight-bit slice of history" while adjustment, or preemphasis of transition, is accomplished by selection of a delay or advancement in accordance with the known peak shift characteristics of the particular data pattern observed by the ROM 146. Of course, as will be explained, only certain data patterns are permissible. If data would normally be coupled to the writing head via flip flop 136 of shift register 124, it is apparent that the selection by multiplexer 144 of the outputs of stages 128 through 140 will add progressively more delay to the data transition. This process occurs for every data bit, since the total delay of register 124 is equal to one data cell time, which in turn equals the time required to clock one data bit through one stage of register 104.

Figure 3:
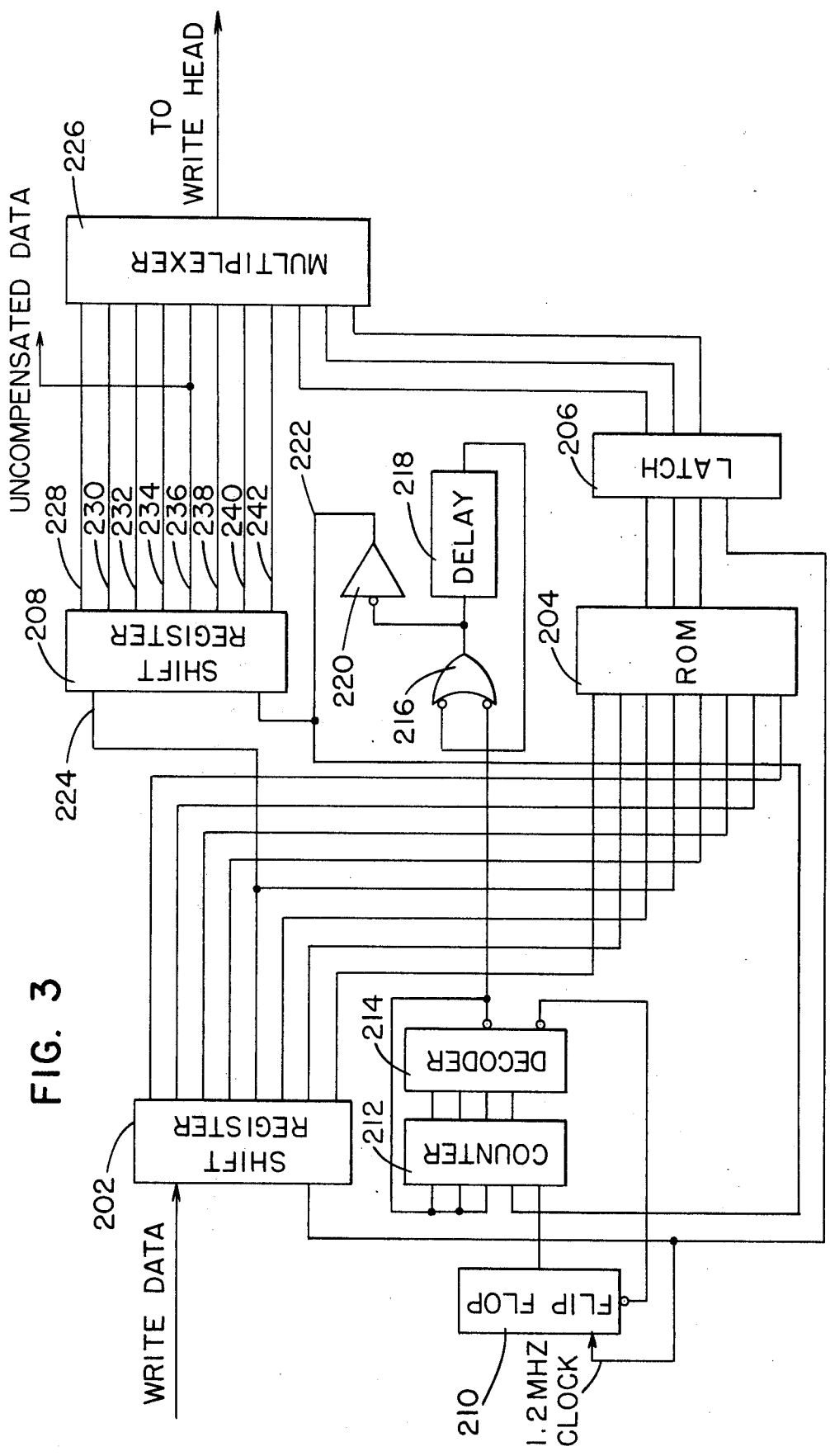
FIG. 3 is a detailed block diagram of the invention described with reference to FIG. 2.
Figure 4:
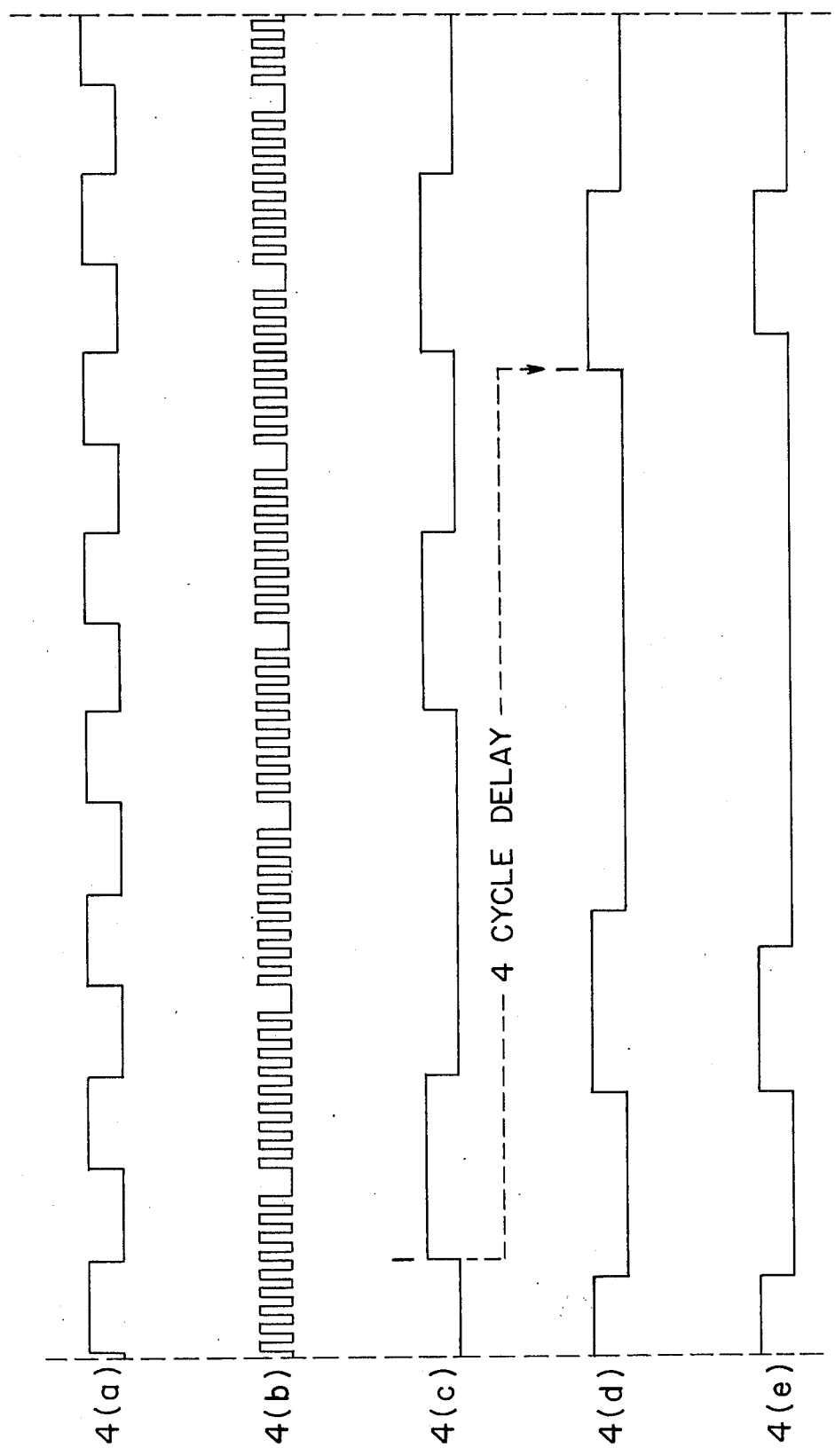
FIGS. 4(A) through 4(E) are waveforms descriptive of the operation of the invention described with reference to FIG. 3.

Referring now to FIGS. 3 and 4, the write compensation technique and circuitry described with reference to FIG. 2 is described in greater detail. GCR encoded NRZI write data from the controller is coupled to shift register 202 at the data input thereof. An exemplary data waveform is illustrated by waveform 4(C), which waveform is illustrative of the binary sequence 11011111. In actual practice, GCR format precludes more than two consecutive zeros or more than five logical ones in an eight bit sequence; hence, the illustrated waveform is by way of example only. Shift register 202 comprises an 8-bit serial to parallel converter having eight output lines for coupling in parallel the NRZI data therein to a ROM 204, or a PROM (programmable ROM) wherein the particular NRZI data pattern is examined by the ROM to enable the proper code from the ROM to be coupled to a data stabilizing latch 206 such that the ROM's selection function is performed. The eight-bit wide slice of data, depending only upon the instantaneous arrangement of logical ones and zeros in succession, is utilized by the ROM to preemphasize data transitions, either advancing or delaying them by appropriate selection of the output tap of shift register 208. The 1.2 MH$_z$ input clock shown by FIG. 4(A) is coupled to a flip flop 210 from the controller at the clock input. A four-bit binary counter 212 is gated by the incoming cell clock, the output of which counter 212 is decoded by a BCD decoder 214, the output of which is coupled to a phase clock generating circuit. The phase clock generating circuit generates the phase clock pulse train illustrated by waveform 4(B), which pulse train clocks shift register 208 at a frequency higher than that of the input clock at an integral multiple thereof, which multiple is at least greater than the number of stages of shift register 202. The phase clock generating circuitry is an oscillator comprised of NAND gate 216 and delay 218, which oscillator is gated ON by the leading edge of the cell clock 4(A). The phase clock 4(B) is inverted by inverter 220 and coupled via line 222 to the clock input of shift register 208, also an 8-bit serial to parallel converter, having as the data input thereto the serial output of shift register 202 via line 224. Data from shift register 208 is coupled to the write heads from any one of the output lines therefrom, in accordance with the selection thereof by multiplexer 226. Since each of lines 228 through 234 delay a particular data transition, line 236 leaves the transition point unaltered, and lines 238 through 242 advance the transition, it can be seen that preemphasis of the transition, or peak shift compensation, is achieved by selection of the proper output line by the multiplexer. The 8-bit ROM 204, which may be considered a look-up table, contains 256 word locations in its truth table, and in the embodiment illustrated, a 9316 PROM having a three bit output in a two's complement encoded pattern of digits is shown. While the ROM utilized is a 256X4 ROM which may be time shared with other data tracks, a 256X3 ROM or other memory configuration could be employed.

The function of flip-flop 210, counter 212 and decoder 214 in conjunction with the NAND gate 216 and the delay line 218 is to provide a series of nine clock pulses related in phase to the 1.2 MH$_z$ clock as follows: on the rising edge of the 1.2 MH$_z$ clock, flip-flop 210 is set, which causes the counter 212 to be reset. When the counter 212 is reset, the decoder 214 is such as to condition the NAND gate 216. This allows the oscillator composed of NAND gate 216 and delay 218 to start generating the pulses which are produced by this oscillator and are fed through inverter 220 back to the counter 212. The counter 212 in conjunction with decoder 214, then counts nine of these pulses and then disables the oscillator formed by NAND gate 216 and delay 218. Decoder 214 receives as an input, the output of counter 212. The output of 214 coupled to flip-flop 210 detects a condition of zero count in counter 212 so that the output of decoder 214 coupled to flip-flop 210 is asserted low when counter 212 contains a zero count. Its purpose is to reset flip-flop 210 whenever the counter has a zero count. Flip-flop 210 is set on the rising edge of the 1.2 MH$_z$ clock which causes the output of flip-flop 210 to reset counter 212. The reset of counter 212 is decoded by decoder 214 as aforedescribed, and as such it then feeds reset flip-flop 210. Once reset, counter 212 is then clocked by each clock pulse produced by inverter 220 and it continues to do so until a total of nine clock pulses are produced by inverter 220, at which time the output of decoder 214 is asserted low. This condition disables NAND gate 216 and simultaneously prevents counter 212 from further operation. This completes one cycle of operation. The circuit then stays in this state until the next rising edge of the next MH$_z$ clock.

FIG. 4(C) is illustrative of NRZI data coupled to the ROM with peak shift. Waveform 4(D), which represents the data appearing on line 224 is delayed by four bit cells from the data of 4(A); hence, by compensating waveform 4(D) rather than waveform 4(C), both "look ahead" and "look behind" capability is achieved by the appropriate delay in shift register 208. Waveform 4(E) illustrates the data of waveform 4(D) after compensation is achieved, with the transition occurring at the proper times and the data cell width adjusted due to peak shift compensation.

As previously mentioned, when standard GCR data 8-bits wide is utilized, the peak shift which occurs for each of the possible data patterns is known. Of course, many patterns cannot be encoded, such as three consecutive zeros. The following truth table provides a three-bit binary code from the ROM 204 for selecting the appropriate output stages 228 through 242 of shift register 224 when GCR encoding is used.

| word number | output | word number | output |
|---|---|---|---|
| 0 thru 16 | 000 | 114 | 001 |
| 17 | 110 | 115 | 001 |
| 18 | 111 | 116 | 010 |
| 19 | 111 | 117 | 010 |
| 20 thru 43 | 000 | 118 | 001 |
| 44 | 110 | 119 | 001 |
| 45 | 110 | 120 thru 135 | 000 |
| 46 | 101 | 136 | 001 |
| 47 thru 48 | 000 | 137 | 001 |
| 49 | 111 | 138 | 010 |
| 50 | 111 | 139 | 010 |
| 51 | 111 | 140 | 001 |
| 52 | 001 | 141 | 001 |
| 53 | 001 | 142 | 110 |
| 54 | 001 | 143 thru 144 | 000 |
| 55 | 001 | 145 | 110 |
| 56 thru 71 | 000 | 146 | 111 |
| 72 | 001 | 147 | 111 |
| 73 | 001 | 148 | 111 |
| 74 | 001 | 149 | 111 |
| 75 | 001 | 150 | 001 |
| 76 | 111 | 151 | 001 |
| 77 | 111 | 152 thru 171 | 000 |
| 78 | 111 | 172 | 110 |
| 79 thru 80 | 000 | 173 | 110 |
| 81 | 101 | 174 | 101 |
| 82 | 110 | 175 thru 176 | 000 |
| 83 | 110 | 177 | 111 |
| 84 thru 107 | 000 | 178 | 111 |
| 108 | 111 | 179 | 111 |
| 109 | 111 | 180 | 111 |
| 110 | 110 | 181 | 111 |
| 111 thru 112 | 000 | 182 | 001 |
| 113 | 110 | 183 | 001 |
| 184 thru 199 | 000 | 209 | 101 |
| 200 | 001 | 210 | 110 |
| 201 | 001 | 211 | 110 |
| 202 | 001 | 212 thru 235 | 000 |
| 203 | 001 | 236 | 111 |
| 204 | 111 | 237 | 111 |
| 205 | 111 | 238 | 110 |
| 206 | 111 | 239 thru 255 | 000 |
| 207 thru 208 | 000 | | |

The code 000 indicates no compensation required or an illegal code pattern; hence, any output present from shift register 208 will be coupled via the uncompensated data line 236, while the other selection codes select lines 228 through 242, excluding line 236. For example, for address word 17, the code 110 would advance the transition two steps forward.

While the invention has been shown and described with reference to a preferred embodiment thereof, it will be understood that persons skilled in the art may make modifications thereof without departing from the spirit and scope of the invention as defined by the claims appended hereto.

What is claimed is:

1. A system for recording data on a magnetic medium comprising:

a data source for supplying data signals having signal transitions therein with varying amounts of peak shift associated therewith in accordance with a predetermined code;

first shift register means for serially receiving said data signals at a first clock frequency and having parallel data outputs;

storage means for receiving said parallel data outputs and for generating a selection signal in response to the amount of peak shift therein;

second shift register means having coupled thereto one of said parallel data outputs of said first shift register, and having a plurality of parallel data outputs therefrom;

means for deriving a second clock frequency which is greater than said first clock frequency for clocking data through said second shift register;

output selection means responsive to said selection signal for selecting one of the outputs of said second shift register for coupling data therefrom, such that the signal transitions of said data are delayed or advanced in time a predetermined amount being incrementally proportional to said peak shift associated with the data coupled therefrom; and means for writing data coupled from said second shift register on said magnetic medium.

2. A system in accordance with claim 1 wherein said storage means comprises a look-up-table for generating selection signals in response to the particular encoding pattern of data signals coupled thereto.

3. A system in accordance with claim 2 wherein said storage means is a read-only-memory.

4. A system in accordance with claim 3 wherein said second clock frequency is a multiple of said first clock frequency equal to or greater than the number of stages of said second shift register, such that data is clocked through said second shift register at a rate equal to or greater than the rate at which data is clocked through one stage of said first shift register.

5. A system in accordance with claim 4 wherein said output selection means comprises a multiplexer.

6. A system in accordance with claim 5 wherein said first clock frequency is a pulse train and wherein said means for deriving said second clock frequency is gated on by each of said first clock frequency pulses.

7. A system in accordance with claim 5 wherein said magnetic medium comprises magnetic tape.

8. A method of peak shift compensation in magnetic recording including the steps of:

coupling a data signal containing a plurality of transitions from one signal state to another signal state at predetermined intervals and varying degrees of peak shift associated with said transitions to a storage means having an output;

serially coupling said data signal to a shift register having a plurality of outputs, one output for each shift register stage, at a frequency greater than the rate at which said predetermined intervals occur;

selecting an output from said parallel outputs of said shift register in accordance with the output of said storage means; and providing said output from said storage means in accordance with and proportional to the peak shift in the particular pattern of transitions in said data signal coupled thereto such that said output from said shift register is selected to shift in time selected data transitions prior to recording of said data by delaying or advancing in discrete increments in time said data transition in accordance with said selected output from said shift register.

9. A method of peak shift compensation in magnetic recording comprising the steps of:

supplying a data signal containing a plurality of signal transitions at selected intervals;

clocking said data signal serially through a first shift register at a first frequency;

simultaneously coupling the output of said shift register in parallel to a storage means and serially to a second shift register having a plurality of stages;

clocking the data through said second shift register at a second frequency, said second frequency being greater than said first frequency;

generating a selection signal from said storage means in accordance with the pattern of transitions of said data signal; and utilizing said selection signal to select one of a plurality of possible parallel outputs, each output corresponding to one of said stages from said second shift register for serially coupling said data therefrom, such that said second shift register functions as a multitap delay line with a delay proportional to the stage selected by said selection signal.

10. A method of peak shift compensation in accordance with claim 9 comprising the additional steps of:

coupling the output of said second shift register to a magnetic writing transducer; and writing said data on a magnetic medium with said writing transducer, said transitions being either delayed or advanced incrementally to compensate for peak shift caused by the particular encoded data pattern.

11. A method of peak shift compensation in accordance with claim 9 wherein the step of generating a selection signal from said storage means includes the substeps of:

examining the transition pattern of said data signal; and coupling said data signal to a read only memory having stored therein a program for preemphasizing the signal transitions coupled thereto to compensate for peak shift.

12. A method of peak shift compensation in accordance with claim 11 wherein said read only memory functions as a look-up table.

13. A method of peak shift compensation in accordance with claim 9 wherein said second frequency is at least eight times greater than said first frequency and wherein said second shift register is comprised of at least eight stages.

14. A peak shift compensation circuit comprising:

means for suppling a digital data signal having a first bit frequency;

shift register means for serially receiving said data signal and for shifting said data signal therethrough at a second frequency, said second frequency being greater than said first frequency and said shift register having a plurality of parallel outputs, each of said outputs being selectable for serially coupling said data signal from said shift register from the selected output;

means for examining predetermined characteristics of said data signal prior to the shifting of said data signal by said shift register, and for generating a selection signal in response to said predetermined characteristics; and means responsive to said selection signal for selecting one of said parallel outputs of said shift register for proportionally altering the predetermined characteristics of said data signal in accordance with the selected output, such that each output provides an incremental delay, said selected output being proportional to said predetermined characteristics of said data signal.

15. A peak shift compensation circuit in accordance with claim 14 wherein said means for supplying a data signal at a first bit frequency comprises a serial to parallel conversion circuit and wherein said digital data signal is a digital signal containing data encoded as signal transitions at periodic bit cell intervals.

16. A peak shift compensation circuit in accordance with claim 15 wherein said periodic bit cell intervals are clocked through said serial to parallel conversion circuit at said first bit frequency.

17. A peak shift compensation circuit in accordance with claim 16 wherein said means for examining predetermined characteristics of said data signal includes a look-up table responsive to known peak shift characteristics of said data signal and for generating said selection signal in response to such known characteristics to provide a proportional compensation for said peak shift.

18. A peak shift compensation circuit in accordance with claim 17 wherein said look-up table comprises a read-only-memory, and wherein said selection signal is a binary code.

19. A peak shift compensation circuit in accordance with claim 17 wherein said means responsive to said selection signal is a multiplexer.

20. A peak shift compensation circuit in accordance with claim 19 wherein each of said parallel outputs progressively delays the data signal coupled therefrom.

21. A peak shift compensation circuit in accordance with claim 19 wherein said shift register means comprises N stages and wherein said second frequency is at least N times greater than said first bit frequency.

22. A peak shift compensation circuit in accordance with claim 21 wherein said serial to parallel conversion circuit comprises a shift register through which data is clocked at 1/Nth of the second frequency.

23. A magnetic recording system for recording digital data in a plurality of channels, wherein each channel includes:

means for suppling a digital data signal having a first bit frequency;

shift register means for serially receiving said data signal and for shifting said data signal therethrough at a second frequency, said secnd frequency being greater than said first frequency and said shift register having a plurality of parallel outputs, each of said outputs being selectable for serially coupling said data signal from said shift register from the selected output;

means for examining predetermined characteristics of said data signal prior to the shifting of said data signal by said shift register, and for generating a selection signal in response to said predetermined characteristics; and means responsive to said selection signal for selecting one of said parallel outputs of said shift register for progressively altering the particular characteristics of said data signal in accordance with the selected output such that each output provides an incremental delay, said selected output being proportional to said predetermined characteristic of said data signal.

24. A magnetic recording system in accordance with claim 23 wherein said means for examining predetermined characteristics of said data signal comprises a look-up-table having a plurality of multiplexed outputs, said multiplexed outputs being said selection signals in said channels.

25. A magnetic recording system in accordance with claim 24 wherein said look-up-table comprises a read-only-memory.

* * * * *